United States Patent [19]

Bessler

[11] 4,446,054

[45] May 1, 1984

[54] DEMULSIFICATION OF SURFACTANT-PETROLEUM-WATER FLOOD EMULSIONS

[75] Inventor: Donald U. Bessler, St. Louis, Mo.

[73] Assignee: Petrolite Corporation, St. Louis, Mo.

[21] Appl. No.: 835,390

[22] Filed: Sep. 21, 1977

Related U.S. Application Data

[63] Continuation-in-part of Ser. No. 713,707, Aug. 12, 1976, Pat. No. 4,089,803.

[51] Int. Cl.$^3$ .............................................. B01D 17/04
[52] U.S. Cl. ................................... 252/344; 252/331; 252/358; 252/8.55 D
[58] Field of Search ........... 252/344, 331, 358, 8.55 D

[56] References Cited

U.S. PATENT DOCUMENTS

| | | | |
|---|---|---|---|
| 2,499,370 | 3/1950 | DeGroote et al. | 252/331 |
| 2,552,534 | 5/1951 | DeGroote | 252/344 |
| 3,259,587 | 7/1966 | Dickson et al. | 252/344 |
| 3,637,521 | 1/1972 | Tsuk | 252/344 X |
| 3,907,701 | 9/1975 | Liebold et al. | 252/344 |

*Primary Examiner*—Josephine Barr
*Attorney, Agent, or Firm*—Sidney B. Ring; Hyman F. Glass; Leon Zitver

[57] ABSTRACT

This invention relates to the demulsification of surfactant petroleum water flood emulsions which comprises treating such emulsions with a demulsifier in conjunction with an amine, preferably a polyalkylenepolyamine.

4 Claims, No Drawings

DEMULSIFICATION OF SURFACTANT-PETROLEUM-WATER FLOOD EMULSIONS

This application is a continuation-in-part of copending application Ser. No. 713,707 filed Aug. 12, 1976 now U.S. Pat. No. 4,089,803.

In oil field production, additional oil can be recovered from a formation of waterflooding. This technique of oil recovery involves the injection of water into the oil production formation in secondary or tertiary water floods thereby displacing the oil. The success of a water flood operation is dependent on the effectiveness by which the water replaces oil from the pores of the rock or sand formation. One technique used to achieve this displacement is to reduce the interfacial tension between the oil and water phases. The addition of surfactants to the injection fluids reduces the interfacial tension between the oil and water phases. The net result is an improved displacement of oil from the pores of the formation.

However, the use of surfactants to reduce the interfacial tension causes a stable oil-water (i.e., oil-in-water) emulsion to be formed. These emulsions are difficult and expensive to resolve by application of the usual organic demulsifiers and treating techniques. One example of a surfactant water flood involves the injection of petroleum sulfonate into the water flood. A variation of this involves the use of petroleum sulfonates followed by the injection of a high molecular weight polymer.

I have now devised a method of resolving petroleum emulsions produced from such water floods so as to yield clean oil with a minimum of tank bottoms or interfacial buildup of sludge or emulsion. This process comprises treating petroleum emulsions with conventional petroleum demulsifiers in conjunction with amines, preferably polyalkylenepolyamines.

Although a wide variety of demulsifiers can be employed in this invention, they are not all equally effective. Certain chemical classes of demulsifiers are more effective than others. For example, I have found oxyalkylated phenol-aldehyde resins more effective than the following chemical classes of demulsifiers:

(1) sulfonates
(2) oxyalkylated amines
(3) oxyalkylated alkylphenols
(4) oxyalkylated alcohols, e.g. glycols, or esters.

Furthermore, in any one class of demulsifiers certain species are more effective than others. For example, there is an optimum ratio between oxyalkylate content and type and the basic chemical. Specifically, any particular phenol-aldehyde resin has an optimum ratio of oxyalkylate to resin as well as the types and ratios of alkylene oxide employed. Thus, for each unit of resin one employs a certain optimum unit ratio of alkylene oxides. In addition, there is an optimum unit ratio of hydrophilic alkylene oxide such as ethylene oxide to hydrophobic alkylene oxides such as propylene oxide.

For example, per unit weight of butyl phenolformaldehyde resin, one employs from about 0.1 to 100 unit weight of alkylene oxides, such as from about 0.2 to 75, for example from about 0.3 to 50, but preferably from about 0.5 to 2.0 with certain resins and 25.0 to 30.0 with others. The weight ratio of hydropholic oxide (EtO) to hydrophobic oxide (PrO) is from about 0.1 to 10.0, such as from about 0.1 to 7.5, for example from about 0.2 to 5.0, but preferably from about 0.3 to 2.0. Stated as mole units of alkylene oxide per mole unit of monomer in the resin, one employs from about 0.3 to 300 moles such as from about 0.6 to 225 moles, for example from about 0.9 to 150 but preferably from about 1.5 to 6.0 with certain resins and 75 to 90 with others. The mole ratio of EtO to PrO is from about 0.013 to 13.18, for example from about 0.26 to 6.59, but preferably from about 0.39 to 2.64.

The preferred demulsifiers employed in this invention are oxyalkylated phenol-aldehyde resins, preferably oxyalkylated alkylphenol-formaldehyde resins.

The oxyalkylating agents employed should be capable of producing oxyalkylene or polyoxyalkylene groups, for example derived from any suitable $\alpha,\beta$-alkylene oxide, for example, alkylene oxide of the formula

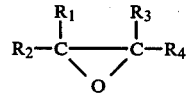

where $R_1$, $R_2$, $R_3$, $R_4$ are hydrogen or a substituted group such as alkyl, cycloalkyl, aryl, etc., for example ethylene oxide, propylene oxide, butylene oxide, amylene oxide, etc.

The phenol-aldehyde resins are of the kind described in U.S. Pat. No. 2,449,370, dated Mar. 7, 1950, to DeGroote and Keiser, preferably those resins obtained from difunctional phenols having 4 to 12 carbon atoms in the substituent hydrocarbon radical but may have as many as 18 carbon atoms, as in the case of resins prepared from tetradecylphenol, substantially paratetradecylphenol, commercially available. Similarly, resins can be prepared from hexadecylphenol or octadecylphenol.

In addition to U.S. Pat. No. 2,449,370, reference is made also to the following U.S. Pat. Nos. 2,499,365, 2,499,366, and 2,499,367, all dated Mar. 7, 1950, to DeGroote and Keiser. These patents, along with the others, describe phenolic resins of the kind herein employed.

The following formula represents a phenol-formaldehyde resin. Actually, some other aldehyde, such as acetaldehyde, propionaldehyde, or butyraldehyde, may be used. The resin unit can be exemplified thus:

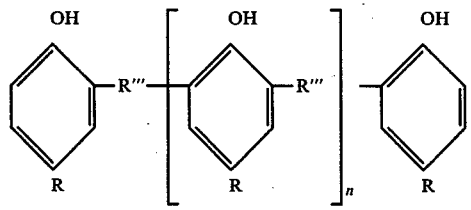

R = hydrocarbon, preferably alkyl in which R''' is the divalent radical obtained from the particular aldehyde employed to form the resin.

The preparation of resins of the kind herein employed as reactants is well known. See U.S. Pat. No. 2,499,368, dated Mar. 7, 1950, to DeGroote and Keiser. Resins can be made using an acid catalyst or basic catalyst or a catalyst showing neither acid nor basic properties in the ordinary sense, or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of free base. The amount may be as small as a 200th of a percent and as much as a few tenths of a percent. Sometimes moderate increase in caustic soda and caustic potash may be used. However, the most desirable procedure in practically every case is to have the resin neutral.

In preparing resins one does not get a single polymer, i.e., one having just 3 units, or just 4 units, or just 5 units, or just 6 units, etc. It is usually a mixture; for instance, one approximately 4 phenolic nuecli will have some trimer and pentamer present. Thus, the molecular weight may be such that it corresponds to a fractional value for n as, for example, 3.5, 4.5 or 5.2.

In the actual manufacture of the resins I found no reason for using other than those which are lowest in price and most readily available commercially. For purpose of convenience suitable resins are characterized in the following table:

TABLE I

| Ex. No. | R | Position of R | R''' derived from | n | Mol. wt. of resin molecule (based on n + 2) |
| --- | --- | --- | --- | --- | --- |
| 1a | Phenyl | Para | Formaldehyde | 3.5 | 992.5 |
| 2a | Tertiary butyl | Para | Formaldehyde | 3.5 | 882.5 |
| 3a | Secondary butyl | Ortho | Formaldehyde | 3.5 | 882.5 |
| 4a | Cyclohexyl | Para | Formaldehyde | 3.5 | 1,025.5 |
| 5a | Tertiary amyl | Para | Formaldehyde | 3.5 | 959.5 |
| 6a | Mixed secondary and tertiary amyl | Ortho | Formaldehyde | 3.5 | 805.5 |
| 7a | Propyl | Para | Formaldehyde | 3.5 | 805.5 |
| 8a | Tertiary hexyl | Para | Formaldehyde | 3.5 | 1,036.5 |
| 9a | Octyl | Para | Formaldehyde | 3.5 | 1,190.5 |
| 10a | Nonyl | Para | Formaldehyde | 3.5 | 1,267.5 |
| 11a | Decyl | Para | Formaldehyde | 3.5 | 1,344.5 |
| 12a | Dodecyl | Para | Formaldehyde | 3.5 | 1,498.5 |
| 13a | Tertiary butyl | Para | Acetaldehyde | 3.5 | 945.5 |
| 14a | Tertiary amyl | Para | Acetaldehyde | 3.5 | 1,022.5 |
| 15a | Tertiary amyl | Para | Acetaldehyde | 3.5 | 1,330.5 |
| 16a | Tertiary butyl | Para | Butyraldehyde | 3.5 | 1,071.5 |
| 17a | Tertiary amyl | Para | Butyraldehyde | 3.5 | 1,148.5 |
| 18a | Nonyl | Para | Butyraldehyde | 3.5 | 1,456.5 |
| 19a | Tertiary butyl | Para | Propionaldehyde | 3.5 | 1,008.5 |
| 20a | Tertiary amyl | Para | Propionaldehyde | 3.5 | 1,085.5 |
| 21a | Nonyl | Para | Propionaldehyde | 3.5 | 1,393.5 |
| 22a | Tertiary butyl | Para | Formaldehyde | 4.2 | 996.6 |
| 23a | Tertiary amyl | Para | Formaldehyde | 4.2 | 1,083.4 |
| 24a | Nonyl | Para | Formaldehyde | 4.2 | 1,430.6 |
| 25a | Tertiary butyl | Para | Formaldehyde | 4.8 | 1,094.4 |
| 26a | Tertiary amyl | Para | Formaldehyde | 4.8 | 1,189.6 |
| 27a | Nonyl | Para | Formaldehyde | 4.8 | 1,570.4 |
| 28a | Tertiary amyl | Para | Formaldehyde | 1.5 | 604.0 |
| 29a | Cyclohexyl | Para | Formaldehyde | 1.5 | 646.0 |
| 30a | Hexyl | Para | Formaldehyde | 1.5 | 653.0 |
| 31a | Hexyl | Para | Acetaldehyde | 1.5 | 688.0 |
| 32a | Octyl | Para | Acetaldehyde | 1.5 | 786.0 |
| 33a | Nonyl | Para | Acetaldehyde | 1.5 | 835.0 |
| 34a | Octyl | Para | Butryaldehyde | 2.0 | 986.0 |
| 35a | Nonyl | Para | Butryaldehyde | 2.0 | 1,028.0 |
| 36a | Amyl | Para | Butryaldehyde | 2.0 | 860.0 |
| 37a | Butyl | Para | Formaldehyde | 2.0 | 636.0 |
| 38a | Amyl | Para | Formaldehyde | 2.0 | 692.0 |
| 39a | Hexyl | Para | Formaldehyde | 2.0 | 748.0 |
| 40a | Cyclohexyl | Para | Formaldehyde | 2.0 | 740.0 |

These resins are oxyalkylated to form the demulsifier of this invention to form oxyalkylates of the general formula

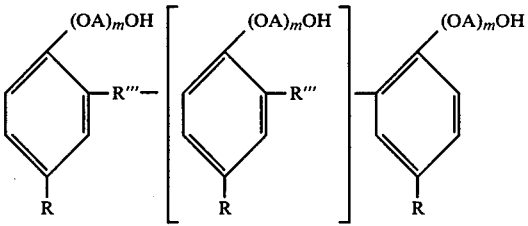

Where A is the alkylene unit derived from the alkylene oxide and m is the number of alkylene oxides per monomer unit A wide variety of amines can be employed in this invention including mono and polyamines. In general, the polyamines employed are polyalkylene polyamines for example of the general formula $NH_2(AN^H)_nH$ where A is alkylene and n a number, for example 1–10 or greater. A is for example $(CH_2)_x$ where x is 2 to 10 or greater. For example $NH_2CH_2NHCH_2NH_2$ would be an effective amine to use.

In practice, I have found mixtures of polyalkylene polyamines very effective and economical as illustrated by the following:

(1) Amine #2 which is a mixture of polyamines of the formula $NH_2(CH_2CH_2N^H)_xH$ which contains diethylene triamine and triethylamine tetramine with minor amounts of ethylene diamine, tetraethylene pentamine and higher.

(2) Pentaethylene hexamine and pentaethylene hexamine bottoms (3) Bis(hexamethylene) triamine

H
N [(CH$_2$)$_6$NH$_2$]$_2$ (4) Alkanolamines such as triethanolamine; as well as the condensed alkanolamines such as polyalkanolamines for example polyethanolamines.

The following compositions illustrate compositions of this invention.

Composition 1

| Wgt. % Active Ingredients | | | Wgt. % Total Formulation |
|---|---|---|---|
| oxyalkylated resin | 60% | Demulsifier: Butylphenol-formaldehyde resins 20 wgt PrO + 7 Wgt EtO | 30.0 |
| Amine | 40% | Amine: Pentaethylene Hexamine bottoms | 20.0 |
| | | Solvent | 50.0 |

Composition 2

Composition 1 where the oxyalkylated resin is 10% and the amine is 90% on an active basis.

Composition 3

Composition 1 where the oxyalkylated resin is 80% and the amine is 20% on an active basis.

Composition 4

Composition 1 where the amine is tetraethylene pentamine.

Composition 5

Composition 1 where the amine is diethylenetriamine.

Composition 6

Composition 1 where the amine is pentaethylene hexamine.

Compositions 7, 8, 9, 10, 11, 12

Compositions 1, 2, 3, 4, 5, 6 where the oxyalkylated resin is a mixed butyl/nonylphenol-formaldehyde resin+0.4 wgt. EtO+0.2 wgt. PrO, the amine being the same as in the above.

Compositions 13-24

Compositions 1-12 where the amine is poly(triethanol amine) instead of the amine of said compositions.

Compositions 25-36

Compositions 1-12 where the amine is Bis(hexamethylene) triamine instead of the amine in said compositions.

Test Examples

The following treating agents were added in the amounts shown in the Table below to a sample of total produced fluids containing 20% oil and 500 ppm of petroleum sulfonate. The test bottles were agitated and allowed to stand for 6 hrs. at 70° F. The results are presented in the following Table II.

TABLE II

Sample - Total Produced fluids (20% oil, 500 ppm petroleum sulfonate concentration)

Test Conditions: Time 6 hours; Temperature 70° F.; Agitation 100 shakes

| Ex. | Treating Agent | Concentration ppm | Visual Observation Water | Visual Observation Interface | Oil Quality BS&W % |
|---|---|---|---|---|---|
| 1 | Blank | — | poor | poor 10 ml emulsion | 35.0 |
| 2 | Composition 1 | 25 | poor | fair 2 ml emulsion | 4.8 |
| 3 | Composition 1 | 50 | fair | good trace emulsion | 0.6 |
| 4 | Composition 1 | 100 | good | excellent | 0.1 |
| 5 | Composition 1 | 200 | good | excellent | 0.0 |
| 6 | butylphenol + PrO + EtO 1/20/7 wgt. ratio | 50 | poor | good | 34.2 |
| 7 | butylphenol + PrO + EtO 1/20/7 wgt. ratio | 200 | poor | poor | 34.0 |
| 8 | butylphenol + PrO + EtO 1/20/7 wgt. ratio | 500 | poor | poor | 34.8 |
| 9 | Tretamine #2 | 50 | poor | poor | 35.0 |
| 10 | Tretamine #2 | 200 | poor | poor | 34.2 |
| 11 | Tretamine #2 | 500 | poor | poor | 34.6 |

Oil was separated from total produced fluids. The separated oil contained 38% BS&W and 500 ppm of petroleum sulfonate.

The treating agents were added to the separated oil in the concentrations shown in the following Table, shaken 100 times and allowed to stand for 6 hours at 70° F. The results are shown in the following Table III.

TABLE III

Sample - Oil only after free water removed 38% BS&W, 500 ppm petroleum sulfonate Test Conditions: Time 6 hours; Temperature 70° F.; Agitation 100 shakes

| Ex. | Treating Agent | Concentration ppm | Visual Observation Water ml. | Visual Observation Interface ml. | Oil Quality BS&W % |
|---|---|---|---|---|---|
| 1 | Blank | — | 0 | 52 | 38.4 |
| 2 | Composition 1 | 200 | 1 | 36 | 36.6 |
| 3 | Composition 1 | 500 | 30 | 6 | 4.8 |
| 4 | Composition 1 | 1000 | 37 | 0 | 0.1 |
| 5 | Composition 1 | 1500 | 37 | 0 | 0.0 |
| 6 | Butylphenol + PrO + EtO 1/20/7 wgt. ratio | 200 | 0 | 51 | 38.0 |
| 7 | Butylphenol + PrO + EtO 1/20/7 wgt. ratio | 1000 | 0 | 48 | 37.8 |
| 8 | Butylphenol + PrO + EtO 1/20/7 wgt. ratio | 2000 | 0 | 46 | 38.2 |
| 9 | Tretamine #2 | 200 | 0 | 52 | 37.6 |
| 10 | Tretamine #2 | 1000 | 0 | 51 | 37.8 |
| 11 | Tretamine #2 | 2000 | 0 | 49 | 37.0 |

The above tests of Tables II and III were repeated with poly(ethanolamine) or BHMT amine in place of the pentaethylene hexamine in compositions. Results similar to those in the above tables were obtained, but required a higher concentration than shown in Table II and III in order to produce saleable oil.

The tests in Table II and Table III were also run in which the oxyalkylated resin of Compound 1 was substituted with butyl/nonylphenol-formaldehyde resin+0.4 wgt. EtO+0.2 wgt. PrO. Similar results were obtained.

From the above tables it is evident that the demulsifier in conjunction with the amine is superior to either the demulsifier or the amine employed separately (compare Examples 2–4 in both Table II and III with other examples of Tables).

In Ser. No. 713,707 filed Aug. 12, 1976 now U.S. Pat. No. 4,089,803 there was disclosed and claimed the use of a demulsifier in combination with amines, particularly as a demulsifier in chemical floods, surfactant floods, etc. so as to yield clean oil.

The amines employed in combination with the demulsifier may be either amines or amine salts or combinations thereof. The amine salt may be formed prior to addition to the system or formed in situ.

Although both mono- and polyamines can be employed optimum results are obtained by employing demulsifiers with polyamines or salts of polyamines containing 20 or less amino groups. The polyamines and salts thereof which may be individual polyamines or mixtures of polyamines preferably have about 20 or less amino groups, such as from about 2 to 20 amino groups, for example from about 3 to 12 amino groups, but preferably from about 3 to 8 amino groups. This result is unexpected since it is conventionally believed that the higher the number of amino groups the more effective the resolution of the emulsion. However, I have found that where higher polyamines are employed with surfactant floods heavy flocs are formed which are difficult to resolve.

These polyamines are non-flocculating polyamines. In general, flocculation is a characteristic of the higher polyamines. Thus as the number of amino group increases above 20 units, depending on the particular amine, the polyamine tends to become relatively more flocculating.

The polyamine may be expressed by the general formula $$Z\text{\textcircled{N}}_n$$

where Z is the non-amino moiety,  is the amino moiety of the polyamine, and n is a number, for example 20 or less.

A more specific embodiment can be expressed by the formula $$RN^R(AN^R)_nH$$

where the R's are hydrogen, alkyl, alkanol (i.e., hydroxyalkyl), alkanol ether such as —B—(O—B)$_m$OH—, etc. where B is alkylene; and m is a number such as 1 or greater, etc. A is alkylene, such as , where x is for example 2–10 or greater, or —(B(OB))$_m$— having the same meaning as stated above.

For example, a suitable polyamine could be expressed by the general formula

n=20 or less where A is $(CH_2)_{2-6}$.

The polyamine can be derived from condensing alkanolamines such as triethanolamine to yield a complex polyamine containing multiple amino groups, ether groups and alcohol groups, with cyclic components (e.g., substituted dioxanes).

The following are specific examples of polyamines which can be employed in this invention (1) Polyalkylene polyamines of the formula

where n=2–19 and A is alkylene —(CH)$_{2-10}$ and most preferably

including diethylenetriamine, triethylenetetramine, tetraethylene pentamine and higher polyamines.

One example of such higher polyamines are the residues of the reaction products of $NH_3$+ethylenedichloride after the removal of lower polyamines, having 6 amino units or less, an example of which is Polyamine A which is as follows:

| Polyamine A | |
|---|---|
| triethylene tetramine | 1–2% |
| tetraethylene pentamine | 9–10% |
| pentaethylene heaxamine | 22–23% |
| hexaetehylene heptamine and highers | 65–66% |
| nitrogen-total | 30–33% |
| primary nitrogen | 12–15% |
| secondary nitrogen | 3–6% |
| tertiary nitrogen | 5–8% |

Polyamine B

Another example of higher polyamines is Polyamine B formed by reacting Polyamine A with ethylene dichloride to increase its molecular weight.

(2) Polyhexamethylene polyamines of the formula

where n=1–5 preferably

These products may also contain diaminocyclohexane and such mixtures are useful for use in this invention.

(3) Polyalkanolpolyamines prepared by condensing triethanolamine; and triethanolamine still bottoms (i.e., the residue left after the distillation of triethanolamine) which are condensed triethanolamines.

(4) Polyamines derived from the reaction of alkylamines, such as methylamine, with epichlorohydrin.

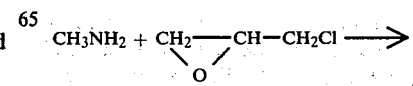

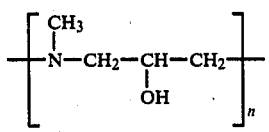

(5) and other polyamines.

The polyamine can be used as such though they are preferably used as their full (or partial) salts derived from reaction with acids, preferably hydrohalic acids such as HCl, etc.

Alternately, the free base can be used and the pH of emulsion can be lowered by use of these same acids.

A more detailed description of a surfactant flood is a petroleum sulfonate flood.

Aqueous petroleum sulfonate mixtures are effective to recover crude oil in improved recovery processes. For example, the mixture can be injected into an oil-bearing subterranean formation and displaced towards a production well to recover crude oil. Mobility buffer slugs, i.e., aqueous solutions containing mobility controlling agents, can be injected behind the surfactant mixture to improve oil recovery.

U.S. Pat. Nos. 3,254,714 and 3,275,075 to Gogarty et al, U.S. Pat. No. 3,497,006 to Jones et al. and U.S. Pat. No. 3,506,070 to Jones teach processes using petroleum sulfonate in micellar dispersions. Optionally a viscosity increasing agent, mobility agent, hydrocarbon, cosurfactant, electrolyte, or combination thereof can be incorporated into the mixture. Examples of amounts include 1 to about 25 percent, preferably about 2 to about 15 percent and most preferably at least about 4 percent by volume of petroleum sulfonates, about 0.01 to about 20 percent by volume cosurfactant, about 0.001 to about 5 percent by weight (based on aqueous medium) of electrolyte, about 1 to about 90 percent and preferably at least about 4 percent by volume hydrocarbon, about 0.001 to about 1 percent or more by weight of the viscosity-increasing agent and/or mobility control agent and the residue aqueous medium (preferably at 5 to about 95 percent by volume). The aqueous mixture can be a micellar dispersion (this term as used herein includes micellar solution and micro-emulsion), and emulsion, solution, etc.

The aqueous medium can be soft water, water containing minor amounts of salts, or brackish water. The cosurfactant can be an amine, aldehyde, ketone, hydroxy-containing compound (including conventional alcohols), ester, ether, or similar compound containing one or more of hydroxy, oxy, amide, halide, etc.; the cosurfactant contains 1 to about 20 or more carbon atoms and preferably about 3 to about 8 carbon atoms. Numerous electrolytes are useful; preferably they are inorganic acids, inorganic bases, and inorganic salts. The hydrocarbon can be crude oil, a partially refined fraction of crude oil, or refined fraction of crude oil, or synthetic hydrocarbon (including halogenated hydrocarbons); the hydrocarbon can be unreacted hydrocarbon within the petroleum sulfonate. Examples of patents which teach particular components useful in the aqueous sulfonate mixture include: U.S. Pat. Nos. 3,254,714 to Gogarty et al.; U.S. Pat. No. 3,307,628 to Sena; 3,330,343 to Tosch et al.; U.S. Pat. No. 3,356,138 to Davis et al.; 3,287,084 to Gogarty et al.; U.S. Pat. No. 3,476,184 to Davis; U.S. Pat. No. 3,497,006 to Jones et al.; U.S. Pat. No. 3,493,047 to Davis et al.; U.S. Pat. No. 3,493,048 to Jones; U.S. Pat. No. 3,500,912 to Davis et al.; U.S. Pat. No. 3,504,744 to Davis et al.; U.S. Pat. Nos. 3,506,070 and 3,506,071 to Jones; and 3,508,611 to Davis et al.

Examples of viscosity increasing agents are the biopolymers such as polysaccharide polymers (e.g., defined in U.S. Pat. Nos. 3,020,206 to Patton et al. and U.S. Pat. No. 3,020,207 to Patton) or any high molecular weight organic polymer that tends to increase the viscosity of the water and which will not substantially adsorb onto the reservoir rock. Examples of mobility control agents include acrylamide polymers, e.g., the partially hydrolyzed, high molecular weight polyacrylamides such as the Pusher ® polymers marketed by Dow Chemical Co., Midland, Mich.; copolymers of acrylamide and acrylic acid or sodium acrylate, N-sulfohydrocarbon-substituted acrylamides (e.g., defined in U.S. Pat. No. 3,679,000 to Kaufman), and commercially available polymers such as Betz Hi-Vis and Bet-Uni-Perm polymers (Betz Laboratories, Inc., Trevose, Pa.), acrylamide polymers sold by Calgon Corporation, Pittsburgh, Pa., and acrylamide copolymers marketed by Nalco Chemical Co., Chicago, Ill. Any high molecular weight polymer which tends to reduce the mobility of the aqueous surfactant mixture flowing through the reservoir rock is useful with this invention. The agents can be present in concentration ranges of about 0.001 to about 1 percent and preferably about 0.01 to about 0.5 percent and more preferably about 0.02 to about 0.1 percent by weight, based on the aqueous mixture.

Other additives, such as corrosion inhibitors, oxygen scavengers, bactericides, etc., can be added to the mixture.

The petroleum sulfonates can be obtained by sulfonating hydrocarbon feedstocks, e.g., heavy vacuum gas oil, having molecular weights within the range of about 300 to about 650 and more preferably about 400 to about 470. Sulfonation of the feedstock is effected by methods known in the art, e.g., with oleum or sulfur trioxide in the absence or presence of a solvent such as ethylene dichloride, sulfur dioxide, unreacted hydrocarbon, etc. The sulfonic acid is neutralized with a basic compound such as sodium hydroxide ammonia, ammonium hydroxide, etc.

Examples of volume amounts of useful aqueous petroleum sulfonate mixtures injected into the reservoir are about 1 to about 50 percent or more formation pore volume, preferably about 1 to about 15 and most preferably about 2 to about 10 percent formation pore volume. Larger pore volumes are, of course, useful where the economics of the process justifies same.

Preferably, the aqueous sulfonate mixture is followed by a mobility buffer slug. The mobility buffer slug is preferably an aqueous solution containing a mobility control agent such as a partially hydrolyzed, high molecular weight polyacrylamide, e.g., the Pusher ® polymers marketed by Dow Chemical Co., Midland, Mich., a high molecular weight polyalkylene oxide polymer, high molecular weight acrylamide polymers containing sulfo grouping (e.g., those defined in U.S. Pat. No. 3,679,000 to Kaufman), acrylamide copolymers (e.g., copolymers of acrylamide and sodium acrylate), etc., biopolymers (preferred in low permeability reservoirs) and any high molecular weight polymer that is compatible within the reservoir and which tends to reduce the mobility of the aqueous solution flowing through the reservoir rock. The mobility control agent can be injected into the reservoir in volume amounts of about 5 to about 150 percent, preferably 25 to about 75 percent and more preferably 50 to about 60 percent formation pore volume. The mobility control agent can be present in concentrations of about 50 to about 2,000, preferably about 100 to about 1,500 and more preferably about 200 to about 1,000 ppm, based on the water.

A water drive is injected into the reservoir to displace the aqueous sulfonate mixture and optionally the mobility control toward a production well to recover crude oil therethrough. Preferably, the water is compatible with the back portion of the mobility control agent and/or the aqueous sulfonate mixture, e.g., preferably it does not substantially leach water soluble components out of the preceding slug. Where the water drive contains ions, it is preferred that these ions are compatible with those within the reservoir.

Preferably, the "mobility profile" of the overall process is graded from a "low" mobility equal to or less than the mobility of the combination of formation fluids (crude oil and interstitial water within the formation) to a "high" mobility equal to or approaching that of the injected water drive. The mobility of the front, mid-section, and back portion of the mobility buffer and optionally of the aqueous sulfonate slug can be designed by adjusting the viscosity and/or mobility control agent concentration to obtain desired mobility characteristics to the process.

In general, the process of resolving the emulsion is carried out in the following manner. The treatment is initiated by addition of the polyamine salt, at a point whereby the polyamine salt becomes well mixed with the emulsion. The polyamine salt is added as a salt or a salt is formed in situ by employing an acid for pH adjustment, such as hydrochloric acid. The point of addition for the polyamine salt is selected so that the optimum mixing and contact time are provided before the emulsion reaches a quiet zone in the treatment apparatus. Once the oil and water phase start to separate a minimum of agitation is desired, since the two phases can be readily reemulsified by excessive agitation of the system. Typically, in an oil field the polyamine salt is injected into the flow line at a well or a junction of several wells to permit mixing while the fluid is flowing to the treatment equipment. The polyamine salt or polyamine and acid (where required) are then injected into the flow line or treater vessel at a point which provides just sufficient agitation to mix these chemicals into the emulsion.

The emulsion is then allowed to pass through a region of low flow velocity where the resolution of the emulsion into separate phases takes place. Heat may be applied to the system, but may not always be necessary.

The addition of acid is used to adjust the pH of the system to the optimum range for resolution of the emulsion. This pH range depends on the particular oil-water emulsion being treated.

The concentration of demulsifier and amine in the fluids to be treated may vary depending on the particular fluids to be treated, the type of and amount of surfactant in the treated fluid, the particular demulsifier employed, the conditions of treatment, etc. In general one employs at least about 12 ppm of demulsifier based on treated fluids such as from about 12 to 1000 ppm, for example from about 20 to 200 ppm, but preferably from about 30 to 60 ppm.

In general, one employs at least about 8 ppm of amine, such as from about 8 to 1000 ppm, for example from about 10 to 100 ppm, but preferably from about 20 to 40 ppm. Thus, the ratio of demulsifier to amine may range from 0.012:1 to 125:1.

In general, the formulation employed contains any suitable ratio of demulsifier to amine which can deliver the proper ratio to the system. Thus, the weight ratio of demulsifier to amine can vary from about 1 to 90 such as about 10 to 80, for example from 25 to 75, but preferably from about 40 to 60.

The formulation can be dissolved in any suitable solvent capable of delivering the formulation to the system to be treated in any suitable concentration such as from an active concentration of 10–100%, such as from 25–75%, but preferably from 40 to 60%.

The following examples are presented for purposes of illustration and not of limitation.

TABLE IV

Total Produced Fluids (14% oil and containing 1000 ppm of petroleum sulfonate

| Test Conditions: | | Time | 24 hours | |
| | | Temperature | 90° F. | |
| | | Agitation | 100 shakes | |
| Ex. | Treating Agent | Concentration ppm | Visual Water | Observation Interface | Oil Quality BS&W |
| --- | --- | --- | --- | --- | --- |
| 1 | Blank | — | Poor | Poor (1.2 ml. emul.) | 19.6 |
| 2 | Composition 1 | 50 | Fair | Fair | 7.3 |
| 3 | Composition 1 | 100 | Fair | Fair | 1.2 |
| 4 | Composition 1 | 200 | Good | Good | 0.2 |
| 5 | HCl Salt of Composition 1 | 50 | Fair | Fair | 3.6 |
| 6 | HCl Salt of Composition 1 | 100 | Good | Good | 0.3 |
| 7 | HCl Salt of Composition 1 | 200 | Excellent | Excellent | 0.1 |

I claim:

1. A composition comprising a demulsifier and an amine or salt thereof, said demulsifier being selected from the group consisting of oxyalkylated phenol-aldehyde resins, sulfonates, oxyalkylated alkylphenols, oxyalkylated alcohols and oxyalkylated esters, and said amine being a polyalkanol amine, the ratio of demulsifier to amine ranging from 0.12:1 to 125:1.

2. The composition of claim 1 where said demulsifier is an oxyalkylated phenol-formaldehyde resin and the polyalkanol amine is selected from the group consisting of triethanol amine and poly (triethanol amine).

3. A process of resolving an oil-in-water emulsion formed during surfactant water flooding which comprises treating said emulsion with the composition of claim 1.

4. A process of resolving an oil-in-water emulsion formed during surfactant water flooding which comprises treating said emulsion with the composition of claim 2.

* * * * *